(12) United States Patent  (10) Patent No.: US 9,367,954 B2
Mueller  (45) Date of Patent: Jun. 14, 2016

(54) ILLUMINATION INFORMATION ICON FOR ENRICHING NAVIGABLE PANORAMIC STREET VIEW MAPS

(75) Inventor: Klaus Mueller, Rocky Point, NY (US)

(73) Assignee: The Research Foundation for The State University of New York, Albany, NY (US)

( * ) Notice: Subject to any disclaimer, the term of this patent is extended or adjusted under 35 U.S.C. 154(b) by 552 days.

(21) Appl. No.: 13/813,775

(22) PCT Filed: Sep. 20, 2011

(86) PCT No.: PCT/US2011/052242
§ 371 (c)(1),
(2), (4) Date: Feb. 1, 2013

(87) PCT Pub. No.: WO2012/040134
PCT Pub. Date: Mar. 29, 2012

(65) Prior Publication Data
US 2013/0120387 A1  May 16, 2013
US 2014/0009468 A2  Jan. 9, 2014

Related U.S. Application Data

(60) Provisional application No. 61/386,305, filed on Sep. 24, 2010.

(51) Int. Cl.
*G06T 15/50* (2011.01)
*G06T 15/04* (2011.01)
*G06T 17/05* (2011.01)
*G06T 19/20* (2011.01)
*G06T 11/00* (2006.01)

(52) U.S. Cl.
CPC ............... *G06T 15/50* (2013.01); *G06T 11/001* (2013.01); *G06T 15/04* (2013.01); *G06T 17/05* (2013.01); *G06T 19/20* (2013.01)

(58) Field of Classification Search
None
See application file for complete search history.

(56) References Cited

U.S. PATENT DOCUMENTS

| | | | |
|---|---|---|---|
| 6,226,005 B1 | 5/2001 | Laferriere | |
| 2006/0176303 A1* | 8/2006 | Fairclough | 345/426 |
| 2008/0143720 A1* | 6/2008 | Elmquist | 345/426 |

(Continued)

OTHER PUBLICATIONS

Meyer A. et al., "Interactive Rendering of Trees With Shading and Shadows", Rendering Techniques, pp. 183-196 (2001).
Jensen H.W., "Global Illumination Using Photon Maps", Rendering Techniques, pp. 21-30 (1996).

(Continued)

*Primary Examiner* — Peter Hoang
(74) *Attorney, Agent, or Firm* — Scully, Scott, Murphy & Presser, P.C.

(57) ABSTRACT

Location-mapped environments that provide panoramic and immersive views of street scenes are augmented with modern data visualization displays, to communicate additional information of interest. Specifically, illumination statistics information is mapped onto building facades in the location-mapped environments. The illumination statistics information can include variations of illumination as a function of time of a day and as a function of the season. The illumination statistics information can also include direct illumination statistics information and indirect illumination statistics information. Further, the illumination statistics can be calculated for any window on a building façade to determine natural lighting through that window. The illumination statistics can be employed, for example, to aid users in selection of real estate properties for rental or purchase.

61 Claims, 8 Drawing Sheets

(56) References Cited

U.S. PATENT DOCUMENTS

| | | | |
|---|---|---|---|
| 2008/0266324 A1 | 10/2008 | Lynch et al. | |
| 2009/0179895 A1 | 7/2009 | Zhu et al. | |
| 2010/0033495 A1 | 2/2010 | Hsu et al. | |
| 2010/0067791 A1 | 3/2010 | Dai | |
| 2012/0035887 A1* | 2/2012 | Augenbraun | G06T 15/06 703/1 |

OTHER PUBLICATIONS

Hachisuka T., Chapter 38, "High-Quality Global Illumination Rendering Using Rasterization", GPU Gems 2: programming techniques for high-performance graphics and general-purpose computation (2005), available at http://http.developer.nvidia.com/GUPGems2/gpugems2_chapter38.html.

International Search Report dated Apr. 10, 2012 issued in PCT/US2011/052242.

* cited by examiner

ILLUMINATION INFORMATION ICON FOR ENRICHING NAVIGABLE PANORAMIC STREET VIEW MAPS

CROSS-REFERENCE TO RELATED APPLICATIONS

This application claims the benefit of U.S. Provisional Application No. 61/386,305 filed on Sep. 24, 2010, the entire contents of which are incorporated herein by reference.

STATEMENT REGARDING FEDERALLY SPONSORED RESEARCH OR DEVELOPMENT

This invention was made with government support under grant number CCF0702699 awarded by the National Science Foundation. The government has certain rights in the invention.

FIELD OF THE INVENTION

The present invention relates to a method of enriching navigable panoramic street views by adding an illumination information icon, a computing system configured to generate an illumination information icon to add to navigable panoramic street views, and a data storage medium embodying a program that generates an illumination information icon to add to navigable panoramic street views.

BACKGROUND OF THE INVENTION

To those looking for an understanding of what life in a particular location is like, the utility of Google Street View is undeniable. Anyone can simply only open a web browser, navigate to Google, and enter a street address to be immediately dropped into a visual still-life of the landscape in Street View. This landscape is an interactive environment where one can modify the camera's orientation into new perspectives and change location on the fly. This interactivity provides immersion into the web environment.

The basic principle of Street View is described in U.S. Patent Application No. 2008/0266324 to Lynch et al., titled "Street level video simulation display system and method." Video data is collected by traveling along roads in a geographic area and storing the video data along with data indicating the positions at which the video data had been captured. This captured video data is then used in navigation systems and other devices that provide navigation, routing, or other features. A video is presented to a user on the display of a navigation system or other device. An application associated with the navigation system uses the previously captured video data to create the video shown to the user. The application selects that video data that shows the end user's position from a vantage point. The application further superimposes an indication on the video at a location that corresponds to the position of the end user.

Street View was launched by Google in May 2007 to allow users to explore the world through images. Google Street View provides users 360° horizontal and 290° vertical panoramic street level views within Google Maps. In 2010, the platforms employed by Google typically include nine directional cameras for the 360° views, a GPS unit for positioning, and laser range scanners. Google collects these images using special cameras and equipment that capture and match images to a specific location using GPS devices. The vehicles employed vans, cars, and even bicycles to provide access to roads with various types of roads. These vehicles are equipped with multiple cameras mounted at a height about 2.5 m from the ground level and configured to generate a panoramic view from each point in the travel route of the vehicle. Once the images are captured, they are "sewn" together to create a 360° panorama. Faces and license plates are blurred before the panoramic images are served and become viewable in Google Maps. As of 2010, Street View is available for almost a dozen countries around the world in North America, Europe and the Asia-Pacific region. By providing an interactive panoramic view, Street View leaves the user with a degree of perception of the area so that the user no longer needs to visit the location in order to feel that the user understands the environment of the location.

U.S. Patent Application Publication No. 2009/0179895 to Zhu et al., titled "Three-Dimensional Annotations for Street View Data" discloses generating annotations corresponding to three-dimensional objects while viewing two-dimensional images. The generation of annotations can be achieved by projecting a selecting object onto a three-dimensional model created from a plurality of two-dimensional images. The selecting object is input by a user while viewing a first image corresponding to a portion of the three-dimensional model. A location corresponding to the projection on the three-dimensional model is determined and content entered by the user while viewing the first image is associated with the location. The content is stored together with the location information to form an annotation. The annotation can be retrieved and displayed together with other images corresponding to the location.

Currently, Google provides the "3D Buildings layer" in Google Earth. The 3D Buildings layer provides a bird's eye perspective of buildings for Google Earth. One of the biggest detailed examples is New York City. The 3D Buildings layer folder has two sub-layers: Photorealistic Building layer that include models with photos applied to add complex details and colors, and Gray Buildings layer which are 3D geometric models without photo textures or colors. The Gray Buildings layer usually came from GIS databases provided to Google by cities or 3D city database companies. Eventually Google acquires photo data for these gray cities and adds the photo-realistic details to the models to generate Photorealistic Building layer.

The 3D models in the layer actually are built by many different people and organizations and uploaded to the Google 3D Warehouse. For this reason, many 3D building models are found all over the world in Google Earth. Most of the 3D building models have been built by people using SketchUp and uploaded to the 3D Warehouse. To be picked up by Google and included in the 3D layer, the 3D building models have to adhere to basic guidelines set out by Google.

In general, one faces a complex task when searching for a new residence in a large urban environment, e.g., in a big city such as New York, Chicago, San Francisco, London, Paris, Tokyo, Beijing, Shanghai, and Seoul. A number of online databases have emerged to help buyers in this quest. Examples are StreetEasy.com and more recently also Google Maps Real Estate. These sites allow users to search and compare apartments for sale by price, size, location, and building history. Typically, pictures of the apartment's interior and sometimes of the building exterior are also available.

While such sites have become indispensible in the search for city apartments, these sites still leave much to be desired because additional information such as the amount of sun exposure at living quarters, in addition to the basic information currently available, can be crucial in determining the desirability of prospective residences. Knowing only whether a particular apartment faces north, south, east, or west is generally not sufficient since other urban structures may block the incoming light either constantly or over significant periods of time. Some real estate listings typically provide links to external location-mapped environments such as Google Street View to allow users to gain some understanding of these more complex variables. However, Google Street View as currently available is necessarily only a snapshot of time, and does not reveal the complex temporal patterns of daily and seasonable exterior lighting.

Access to sunlight, i.e., "solar access," in living spaces is of great importance for quality of life. For example, it has been shown that solar access and exposure are among the key factors in creating attractive settings for pedestrian gathering in streets and plazas. The verticality of urban landscapes tends to amplify the dynamic character of daylight through the casting and progression of shadows by tall buildings. Planners and architects have long appreciated, at least qualitatively, that the energy dynamics of buildings and the perception of the urban environment are related directly to the prevailing daylight conditions.

SUMMARY OF THE INVENTION

A critical element currently missing in currently available applications that provide location-mapped environments, which include Google Street View and Google Earth, is detailed hourly or seasonal information on building façades such as apartment window lighting and illumination. Such information can be very valuable, for example, in the assessment of an apartment's desirability within a search for real estate. Computational methods can be employed that utilize data extracted from such location-mapped environments in combination with additional illumination data from databases to allow users to generate information on "illumination profiles" for specific façades of real estates, and to subsequently visualize such information in the location-mapped environments.

Location-mapped environments that provide panoramic and immersive views of street scenes are augmented with modern data visualization displays, to communicate additional information of interest. Specifically, illumination statistics information is mapped onto building facades in the location-mapped environments. The illumination statistics information can include variations of illumination as a function of time of a day and as a function of the season. The illumination statistics information can also include direct illumination statistics information and indirect illumination statistics information. Further, the illumination statistics can be calculated for any window on a building façade to determine natural lighting through that window. The illumination statistics can be employed, for example, to aid users in selection of real estate properties for rental or purchase.

The present disclosure provides computational methods operating within location mapped environments currently available or to become available in the future that allow users, for each selected real estate, to compute its temporal illumination profile, and to visualize and compare the temporal illumination profile with other temporal illumination profiles for other real estates. Such information does not presently exist, but can be nontrivially derived from publicly available data, employing methods to be described below.

According to an aspect of the present invention, a method of generating information for a location-mapped environment includes: generating illumination statistics information for an area on a façade of a structure at a location in a location-mapped environment; and embedding the illumination statistics information to the area.

According to another aspect of the present invention, a computing system includes a computing means configured to perform a sequence of operations including: generating illumination statistics information for an area on a façade of a structure at a location in a location-mapped environment; and embedding the illumination statistics information to the area.

According to yet another aspect of the present invention, a machine readable non-transitory tangible medium embodies a program for operating a computer system. The program includes a sequence of operations for a computing means to perform. The sequence of operations includes: generating illumination statistics information for an area on a façade of a structure at a location in a location-mapped environment; and embedding the illumination statistics information to the area.

DETAILED DESCRIPTION OF THE INVENTION

Figure 1A:
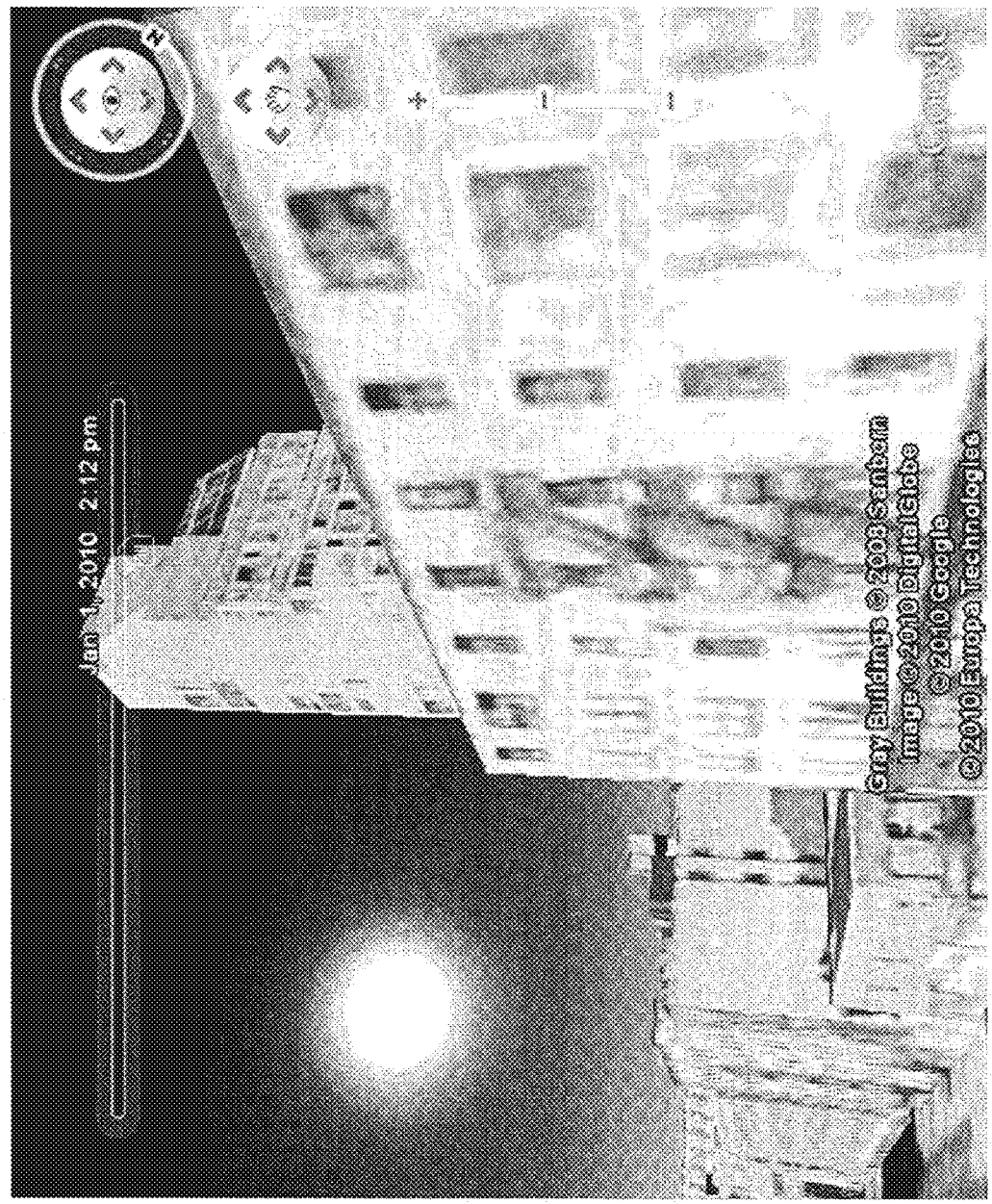
FIG. 1A is a first exemplary scene of Manhattan, N.Y., illustrating light illumination at 2:12 p.m. in January.

As stated above, the present invention relates to a method of enriching navigable panoramic street views by adding an illumination information icon, a computing system configured to generate an illumination information icon to add to navigable panoramic street views, and a data storage medium embodying a program that generates an illumination information icon to add to navigable panoramic street views, which are now described in detail with accompanying figures. It is noted that characters and numbers in the pictures of the drawings are not reference characters or reference numerals, but are parts of original images as captured from a computer screen. As such, the characters and numbers in the pictures of the drawings are not intended to be necessarily legible unless they are clearly legible.

Location-mapped environments such as Google Street View can be large-scale immersive imagery of the real world. Currently, data displayed in location-mapped environments include address labels, advertisements, and tourist information. Embedding such data into a location-mapped environment is essentially an information fusion task. While efforts exist that embed ads and review snippets into displays in a location-mapped environment, such efforts use the available location information as a placement index into the imagery.

The methods of the present disclosure significantly extend and enhance location-mapped environments by adding and presenting illumination statistics information on a relevant area on a façade of a structure. The structure may be a residential building, a commercial building, an industrial building, a transportation infrastructure such as a bridge, a tourist attraction such as a monument, or any structure of which illumination condition conditions can be of interest for personal or commercial use. The relevant area may be the area of a window on a residential, commercial, or industrial building, a yard, or any horizontal, vertical, or slanted surface of which the illumination conditions can be of interest for personal or commercial use.

The framework of the present disclosure can be illustrated by concrete examples. Assume one is in the market for an apartment in New York City. There are a number of online databases available to help in this quest. A popular online database is StreetEasy.com which periodically crawls all real estate broker websites and consolidates the information into a single browsable list, searchable by location, price range, size, building history, and so on. Typically, pictures of the apartment's interior and sometimes the building exterior are also available.

However, additional crucial pieces of information are also neighborhood, window views, and the like. Links to Google Street View are usually provided that allow users to gain some insight into these variables. However, Google Street View is necessarily only a snapshot of time, i.e., a snapshot at the time a vehicle carrying camera's passed through that street. Since vehicles carrying cameras cannot be simultaneously present across the globe, and the gathering of the source images is performed throughout daytime, any information regarding sunlight at a selected point is based on the image taken at a randomly picked time, i.e., the time at which the vehicle that took the image was present at that point.

Under currently available systems, a viewer of a street image cannot gain systematic information about daily and seasonable exterior lighting (illumination) patterns to determine the brightness (and heat) of an apartment except for an impression based on images taken at a random time, i.e., the time of travel by the vehicle that generated the image at that place. Thus, the viewer is forced to resort to educated guesses, second hand information from a real-estate broker, or regular observation an apartment over an extended period of time. Relying on second hand information is unreliable because the real-estate broker may not be familiar with the lighting conditions of the apartment and/or personal interests of the real-estate broker may skew the presentation of what little information that the real-estate broker has. Resorting to regular observation an apartment over an extended period of time is obviously impractical given the fast pace of the real estate market and the associated time and access overhead. The same considerations also apply to assess environmental noise, access to taxis, and a myriad of other variable one may have taken for granted at the current living location. The present disclosure provides methods for computing, and then providing, information items using location-mapped environments such as Google Street View to enable a direct mental mapping of information to 3D locations. Mapping of the information into 3D locations allows easy comparisons illumination conditions of different areas, which can be a part of an apartment along a street or inside a building.

To evaluate these apartment illumination profiles, the methods of the present invention can employ data available in currently available location-mapped environments available through, for example, Google Maps and Google Earth. The data in the currently available location-mapped environments are, however, too raw, disparate, and mentally inaccessible for immediate use for the purposes providing apartment illumination profiles. Thus, the methods of the present invention provide the computational technologies needed to transform such data into desired and manipulatable quantities, and to subsequently make the transformed quantities available through familiar interfaces of such location-mapped environments, e.g., Google Street View.

In one embodiment of the present disclosure, urban geometry available in a currently available location-mapped environment in combination with other climate and environmental data can be utilized to generate an application that allows users to view hourly, daily and seasonal illumination profiles of any given apartment window. These illumination profiles can then be used by potential apartment buyers to estimate the brightness levels inside the advertised apartment, to allow them to match these with personal requirements and daily schedules, and to enable them to visually compare different candidate apartments. Further, the daily and seasonal illumination profiles also enable users to determine the needs for shades, cooling, and heat, the proper placement of plants and solar collectors, etc.

The methods of this disclosure endow users with better access to the information currently inaccessible and hidden in the combination of climate and environmental databases and currently available location-mapped environments, e.g., the geo-spatial data in Google Earth and/or the real estate data in Google Real Estate. Specifically, the methods of this disclosure derive new information items such as the apartment lighting profiles for the users of location-mapped environments. The derived new information can be infused back into a familiar and popular information interfaces, e.g., interfaces available in Google Street View. Private and professional real estate advertisers may then augment their online advertisements with profiles including such derived new information.

In another embodiment of the present invention, the methods of the present invention can be employed to adding information not available at all so far. For example, one would ideally want to know the set of building façade windows associated with a given apartment. However, such information is not publicly available in general, except for rare cases in which a local building department makes such information public. Given proper infrastructure, users with an incentive to add such information, e.g., real estate agents, sellers, buyers, and/or owners, may gladly input this information into a location-mapped environment such as Google Street View. This capability can expand the scope of the disclosed methods by enabling information derived from a crowd, i.e., a crowd-sourced information-gathering aspect, thereby benefitting the internet community as a whole, possibly for future use in apartment searches.

While prior works provides ground level solar access maps as a function of time and climate conditions, a system for providing information on solar exposure at vertical surfaces such as windows of apartment buildings is not known in the art. Further, the methods disclosed herein contrast with prior art methods in several important aspects. First, the sources of any GIS data employed in the prior art are typically commercial GIS databases, while the methods of this disclosure can employ any publicly available data such as data from Google Earth. Second, the prior art can present the computed illumination data as monthly or even yearly averages at best, while the methods disclosed herein can visualize the illumination data as a thumbnail glyph that details the lighting at a specific location at an hourly resolution over a year or more. Third, the results of prior art calculations are mainly summarized in research papers and generated within commercial applications, while the methods disclosed herein provide access within a widely accessible urban GIS viewer, thereby significantly improving the accessibility of the derived information. Fourth, while some of the currently available location-mapped environments may provide capabilities to vary sun illumination over a day, data displayed in such location-mapped environments do not take into account the light's interactions with buildings, and do not provide hourly illumination profiles. In contrast, the methods disclosed herein can provide data that take into account the light's interactions with surrounding buildings as well as providing hourly and seasonal illumination profiles.

In general, the methods disclosed herein can be implemented employing a computer-based system that includes two software modules. The first software module is an illumination profile authoring module that generates a calculated illumination profile for an area on a façade of a structure, which can be a surface of a residential building selected by a user. The second software module is an illumination profile viewing module that displays the calculated illumination profile as a function of user-provided temporal parameters.

The generation of the calculated illumination profile through the illumination profile authoring module requires more expertise and advanced interactions, but is required only once for each selected surface of a residential building. In a non-limiting illustrative example, the generation of the calculated illumination profile can be performed within a location-mapped environment employing the three-dimensional geography information available therein. The display of the calculated illumination profile is a user-initiated task that does not typically require expertise beyond navigation in a location-mapped environment, and can be performed in the same location-mapped environment or in a different location-mapped environment. For example, the generation of the calculated illumination profile can be performed within Google Earth (GE), and the display of the calculated illumination profile can be performed within Google Street View (GSV).

In a non-limiting illustrative example, a computer-based system including an illumination profile authoring module and an illumination profile viewing module can include a target locator program, a geometry extractor program, an illumination profile renderer program, and an illumination profile visualization program, each of which are applications that can be run within the computer based system.

The target locator program enables the user of an application employing a location-mapped environment, e.g., Google Earth program, to navigate to the location of interest. For example, the user can move a computer mouse to an apartment window the illumination profile at which he desires, or select the apartment window employing any other interface such as voice activation or touch screen. Employing an application program interface of the location-mapped environment program, the system can acquire three-dimensional geo-coordinates of the selected building and the viewing direction, which are then passed on to a geometry extractor program.

The geometry extractor program extracts an approximation of building geometry. The lighting of a typical apartment is affected only by a relatively small geographic neighborhood including buildings immediately around the selected apartment and larger and/or taller buildings of which the required size for affecting the illumination conditions of the selected building increases with physical distance from the selected building.

Many different methods for extracting the approximation of building geometry can be employed. In a non-limiting illustrative example, three-dimensional building models within this small neighborhood around the selected apartment building can be acquired from the Google 3D Warehouse, available at http://sketchup.google.com/3dwarehouse/advsearch. If such three-dimensional building models are not available, a good approximation of the building geometry can be extracted, for example, from Google Earth as follows. First, center the location of interest in a top-down view. Second, auto-move the mouse to every pixel of the display window and record the corresponding latitude/longitude/height coordinates shown at the bottom of the window. Third, correct for curvature distortions. Fourth, construct an approximate 3D model. Alternatively, the result of the first and the second step of this process can also be obtained via the Google Earth application program interface.

While data from a geographic information system (GIS), such as a large GIS building database of Manhattan, can also be employed to calculate illumination statistics information, the methods of the present disclosure only requires a rather coarse level of detail (on the order of floor heights or even less), which can be obtained quite easily from Google Earth, which includes a database of images.

In one embodiment, a geometry extractor program may be substituted with a geometry and appearance extractor program. The geometry and appearance extractor program not only extracts information geometry as a geometry extractor program does, but also extracts information on appearance of buildings and other objects (such as trees, benches, and other natural and manmade objects) to obtain information on the color, lightness, diffusivity of reflecting objects around the building of concern. Thus, in addition to geometry, appearance of buildings, such as color and lightness may be captured employing the methods described above. In some cases, trees may be approximated as view-dependent semi-transparent objects using an image-based rendering approach such as the one by A, Meyer, F. Neyret, and P. Poulin, "Interactive Rendering of Trees with Shading and Shadows", Rendering Techniques 2001: 183-196. If future maps provide access to such transparency information, such information may be incorporated into display as desired.

A landscape of 3D models is thus generated, which is then passed to the illumination profile renderer program. Further, the lightness and the color of each façade can be recorded and passed to the illumination profile renderer program to aid in the calculations for the indirect lighting in subsequent steps.

The illumination profile renderer program computes illumination profiles, i.e., illumination statistics information to be subsequently displayed selectively according to user requests. Two types of illumination statistics information are calculated per facet: (1) direct illumination statistics information that quantifies direct sun exposure taking into account seasonal effects, and (2) indirect illumination statistics information that quantifies indirect light exposure as reflected from nearby (light-colored) building facades and other objects, such as trees, located near the facet. These contributions are simulated on an hourly basis for all days of a year and use publicly available satellite data from NASA to obtain information on sun orbits and cloud covers to determine the incident illumination. For example, such satellite data is available at http://weather.msfc.nasa.gov/GOES/.

Not necessarily but preferably, computationally expensive and slow multi-reflection global illumination algorithms, such as photon-mapping, may be avoided since the building facades are typically relatively diffuse (with the exception of heavily windowed hi-rises) in many cases. See H. Jensen, "Global illumination using photon maps," *Rendering Techniques*, pp. 21-30, 1996 for an exemplary photon-mapping method.

The direct illumination statistics information is based on direct illumination of sunlight on an area. If the area of interest includes a façade of a building, the direct illumination statistics information can be generated from a database of images that includes an image of the façade. For example, the direct illumination statistics information can be generated from images available from Google Earth, along with other information, such as building height, In a non-limiting embodiment of the present disclosure, once data sufficient to construct facets of a local neighborhood of buildings is available, a texture is assigned to each building facade to hold the sunlight accumulation data. The texture can be a floating point texture or an integer texture. The floating point texture can be, for example, a graphic processing unit (GPU) floating point texture. For each hour, a two-pass rendering operation of the scene of building geometry is performed from the position of the sun. Orthogonal projection is sufficient since the sun is far away. The first pass removes hidden surfaces, and the second pass renders each facade individually, with the illumination accumulating on the texture buffers. This direct light accumulation is further refined by reducing the accumulation value at each hour based on cloud-coverage. NASA's GEOS satellite offers world-located imagery of cloud coverage over time for each day which we can use as an environment map. In general, any texture can be employed in lieu of the floating point texture, provided that any such texture functions as a storage buffer for storing information on the property of the graphics to be subsequently displayed.

In general, any multi-pass rendering operation or a single-pass rendering operation of the scene of building geometry can be employed instead of a two-pass rendering operation provided that each façade can be rendered individually by the combination of the multiple passes or through the single pass. Irrespective of the number of passes employed to generate a rendering of an image of a façade, hidden surfaces of the façade are removed from the image of the façade and the façade is rendered with a texture buffer containing a light texture mapping. The light texture mapping includes information on accumulation of direct illumination by the sun.

An occlusion factor derived from the intensity value of the clouds in the area can be used to dampen the effect of the direct lighting for that date and time. The portions of the light texture mapping to windows then adds to the sun exposure (or sunshine factor) of the associated apartment. Additionally, higher texture intensity also reflects more direct sunlight illumination, which can be used for the indirect illumination stage described next.

Indirect lighting significantly adds to the sun exposure of a given apartment. It is very important in particular for north-facing apartments. For example, the following radiosity-like scheme can be employed to compute these contributions from the direct illumination textures. For each selected area on a building façade, a perspective rendering operation may be performed. Perspective rendering operation includes orthographic rendering operation as a special case. The selected areas can be, for example, areas of windows on the building façade. The near-plane frustum of a perspective rendering can be made to be oriented and skewed to match the window's relevant immediate facade neighborhood. The perspective rendering can be further weighted by the lightness values of the façades, as needed. The field of view is set to be 180 degrees outward from the surface chosen.

The scenery around the area is textured with the exact floating-point textures derived from the direct-lighting procedure described above. The result of the rendering operation is a new perspective rendering of floating point values that corresponds to the lighting accumulation visible from the area of interest. This correlates with the direct illumination that the selected spot of interest will "see," or be exposed to, over time. This rendering operation produces an "indirect lighting" texture that is summed into a single "indirect lighting contribution" factor that captures the overall amount of illumination from reflected direct lighting that the area, e.g., the window, will receive.

The rendering operation employing the photon-mapping method described above represents a good trade-off between accuracy and interactive performance. Alternately or in parallel, any rendering operation simpler than the photon-mapping operation can also be employed.

While the features of the present disclosure are illustrated employing facades of a building, any object, both as an object that receives direct and indirect illumination and as an object that occludes other objects, can be extended to not only include buildings but also other structures that interact with light, whether such object is natural (such as a tree, a river, a hill, or a valley) or man-made (walls, monuments, etc.)

The method of the present disclosure can also employ more sophisticated indirect illumination techniques such as one described in Toshiya Hachisuka, Chapter 38 "*High-Quality Global Illumination Rendering Using Rasterization*," GPU gems 2: programming techniques for high-performance graphics and general-purpose computation (2005), available at http://http.developer.nvidia.com/GPUGems2/gpugems2_chapter38.html. The approximation of employing the single indirect lighting contribution factor that captures the overall amount of illumination from reflected direct lighting can gives users an interactive means to compare the impact of indirect lighting from set of nearby constructs.

Temporal variations in lighting are then calculated for each selected area. Such temporal variations in lighting, such as those caused by occlusion from high-rises, are significant in crowded cityscapes and heavily depend on location. An apartment may lose the bulk of its expected lighting due to a poor location. Further, due to the random selection of image collection time by vehicles employed to gather data for location-mapped environments, some apartments may appear illuminated in current location-mapped environments although the same apartments are occluded most of time, and some other apartments may appear occluded although the period of occlusion is relatively short. The effect of occlusion by other buildings depends not only on the time of the day, but can also be seasonal due to the shift of the trajectory of the sun.

The illumination profile visualization program displays the data including illumination profile in a format that the user requests. In a non-limiting example, the illumination profile can be encoded into a thumbnail window in a location-mapped environment, which can be the same or different from the location-mapped environment employed to generate the calculated illumination profile. The thumbnail window including the displayed portion of the illumination profile is herein referred to as an "illumination thumbnail," or "IT."

Figure 1B:
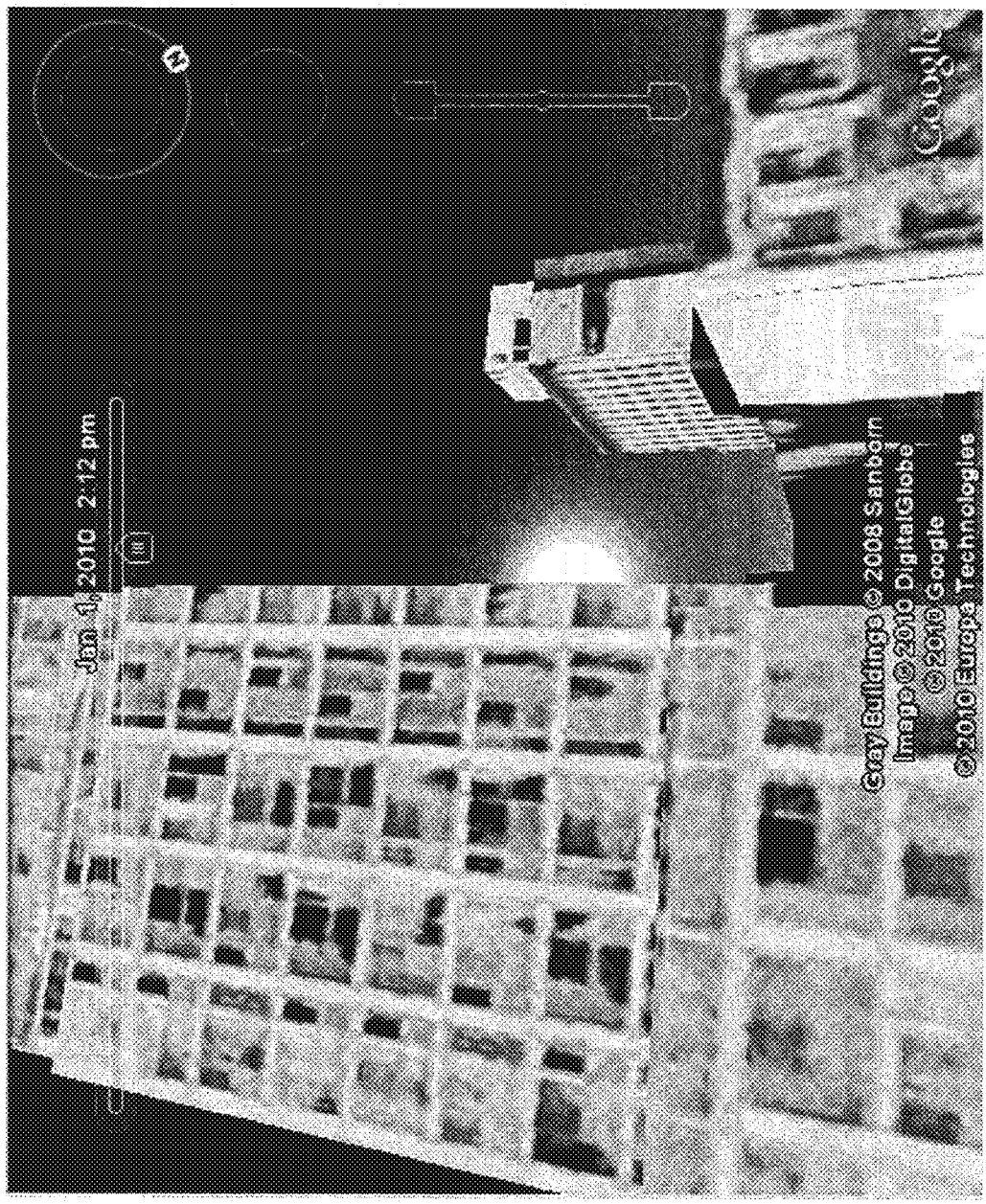
FIG. 1B is a second exemplary scene of Manhattan, N.Y., illustrating light illumination at 2:12 p.m. in January.

Referring to FIGS. 1A and 1B, two typical living situations found in lower Manhattan are illustrated. In FIG. 1A, a high-rise is situated across a low-rise building with residential apartments. At 2:12 p.m. in January, sunlight reaches the opposing apartments to the left of the high-rise, while the apartments directly facing the high-rise and apartments to the right of the high-rise have their light occluded at this time. In FIG. 1B, another, more distant, high-rise that affects lighting in late afternoon can also be seen. Such complex effects of occlusion are hard to gauge in a 1-hour showing through a real-estate broker, but the effects of occlusion often strike property buyers or renters unexpectedly after a move-in.

The methods of the present disclosure extend the capabilities of location-mapped environments by providing an application that offers an understanding of occlusion effects, thereby rendering purchasing, renting, and/or marketing efforts more informed. A user can first open an application for a location-mapped environment such as Google Street View or Google Earth to navigate to a location of interest. Then, the user can see a 3D virtual representation of the area of interest. The user can then employ an application employing methods of the present disclosure to select an area of interest, which can be an apartment of interest on a 3D building façade. Subsequently, the application specifies a half-sphere (hemisphere) around the selected area, which can be a window on a façade of a building, to define the buildings to be employed in the illumination calculations as described above.

Figure 2:
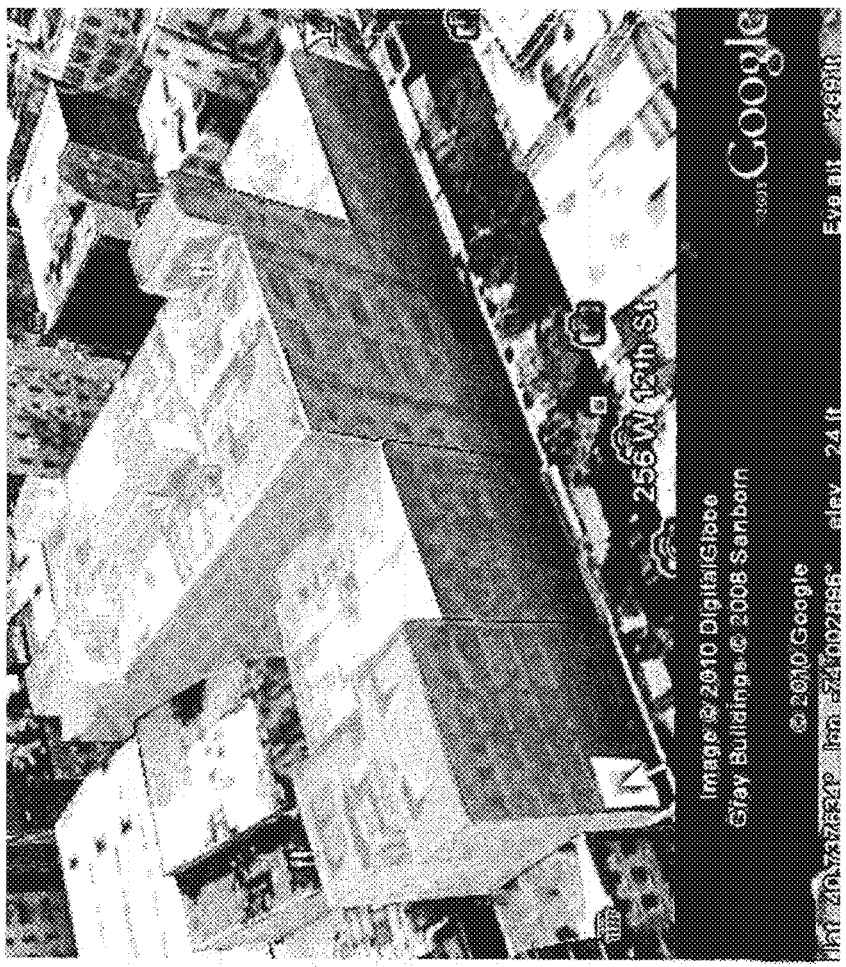
FIG. 2 is a street view with a thumbnail for calculating illumination statistics information.
Figure 2:
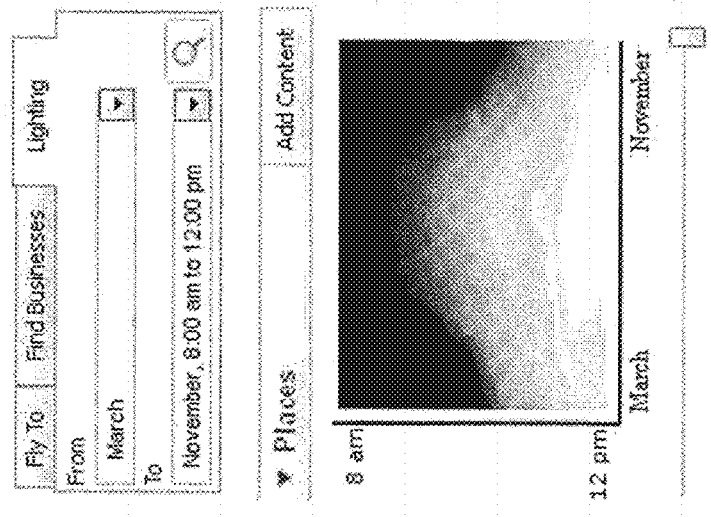

Referring to FIG. 2, an exemplary application window according to the present disclosure is shown to the left of a window displaying a location-mapped environment. The exemplary application window includes tabs labeled "Fly To," "Find Businesses," and "Lighting," of which the "Lighting" tab corresponds to a feature enabled by the present disclosure. The "Lighting" tab includes selectable field listings labeled "from" and "to," which allows a user to select a time period among seasons as well as a time period within a given day. In this exemplary application window, the user has selected a date range from March to November, and a time of day range from 8:00 a.m. to noon. The location-mapped environment in the illustrative example is provided within Google Earth program. The selected area is shown at the bottom left of a façade of a building as a white area with an arrow thereupon. The illumination statistics information, to be provided by the application of the present disclosure, is affected by the selected seasonal time window, the selected daily time window, and the selected area of interest through a set of buildings surrounding the selected area that impacts the direct and indirect sun light exposure.

Dimmer areas on the actual wall facades represent areas that get less direct illumination. For the selected window, the illumination effects over time are computed and displayed in an illumination thumbnail that captures the lighting conditions for the given time range on that window. The horizontal axis can represent the days in a year, and the vertical axis can represent the hours of a given day. Dimmer parts of the thumbnail indicate less light relative to the other times represented by different locations in the thumbnail.

The seasonal changes in lighting are clearly visible in the thumbnail of the lighting application. The thumbnails use intensity windowing to bring out variations at higher illumination levels. Thus, the brightness levels in the morning appear darker than expected. The summer months enjoy extended periods of sunshine and the apartments appears to be well lit throughout the morning. The illumination conditions deteriorate in winter months.

Figure 3A:
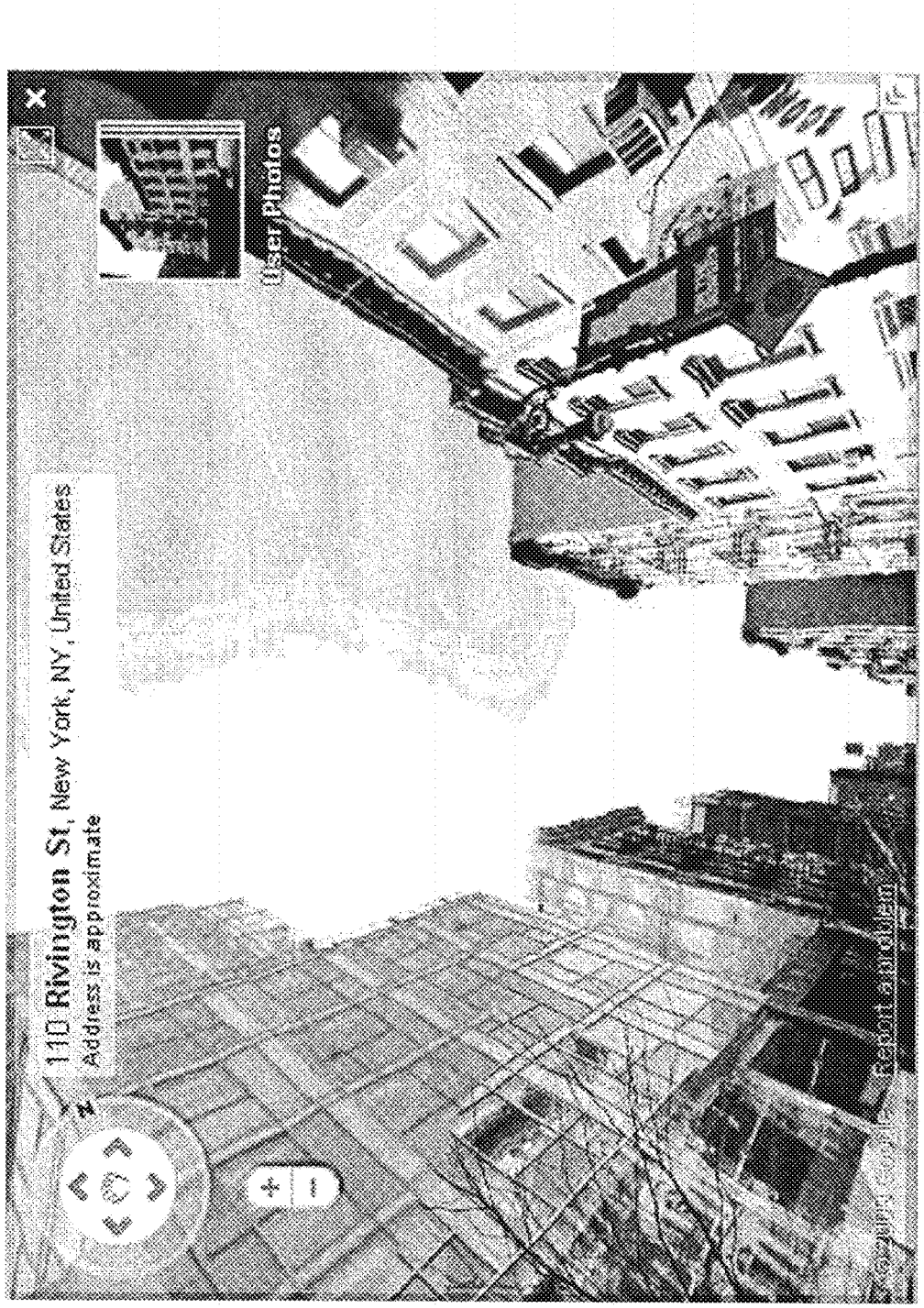
FIG. 3A is a street view of a first exemplary apartment for comparison of illumination statistics information.
Figure 3B:
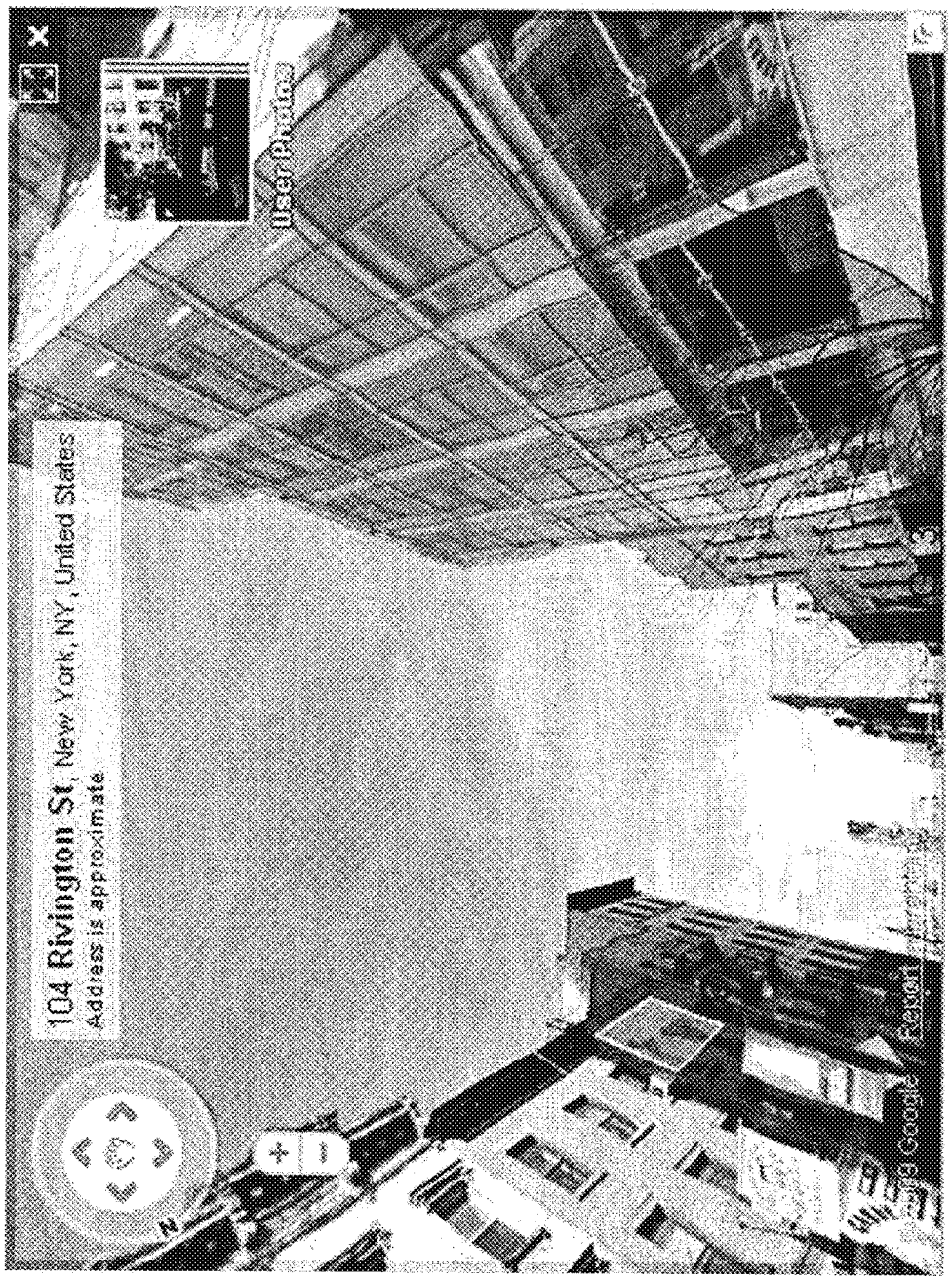
FIG. 3B is a street view of a second exemplary apartment for comparison of illumination statistics information.

Referring to FIGS. 3A and 3B, the lighting conditions in two different apartments up for sale in the block shown in FIGS. 1A and 1B are compared. In this exemplar, the user has selected two different areas across the street from the highrise in FIGS. 1A and 1B. FIG. 3A shows the lighting conditions at 110 Rivington Street, New York, N.Y., and FIG. 3B shows the lighting conditions at 104 Rivington Street, New York, N.Y. at a given time of a single day.

Figure 4A:
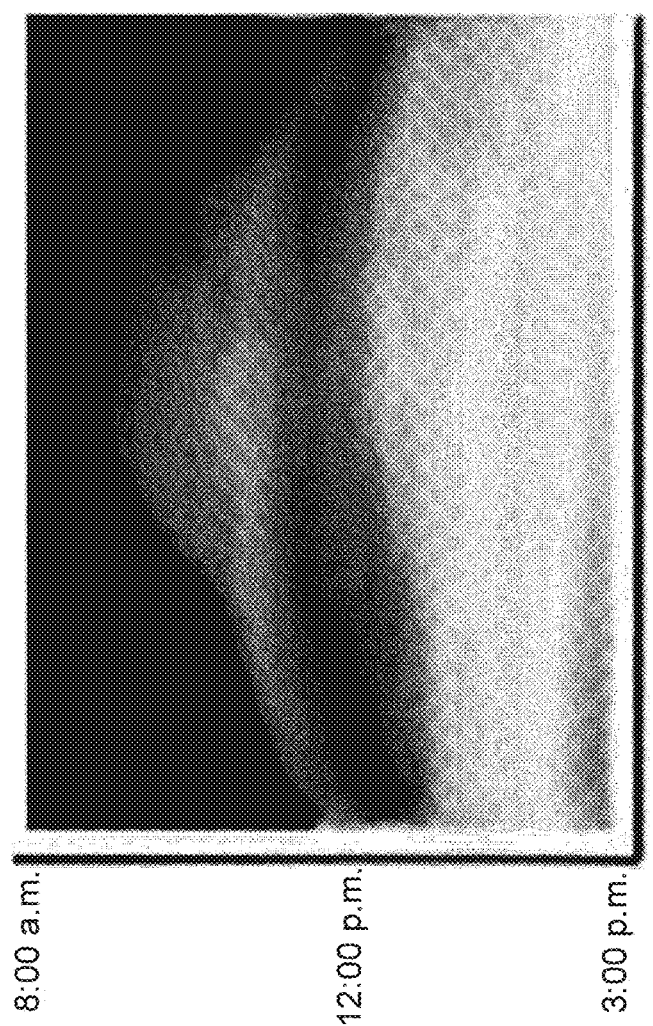
FIG. 4A is a first thumbnail displaying illumination statistics information as a function of the time of a day and the season for the first exemplary apartment.
Figure 4B:
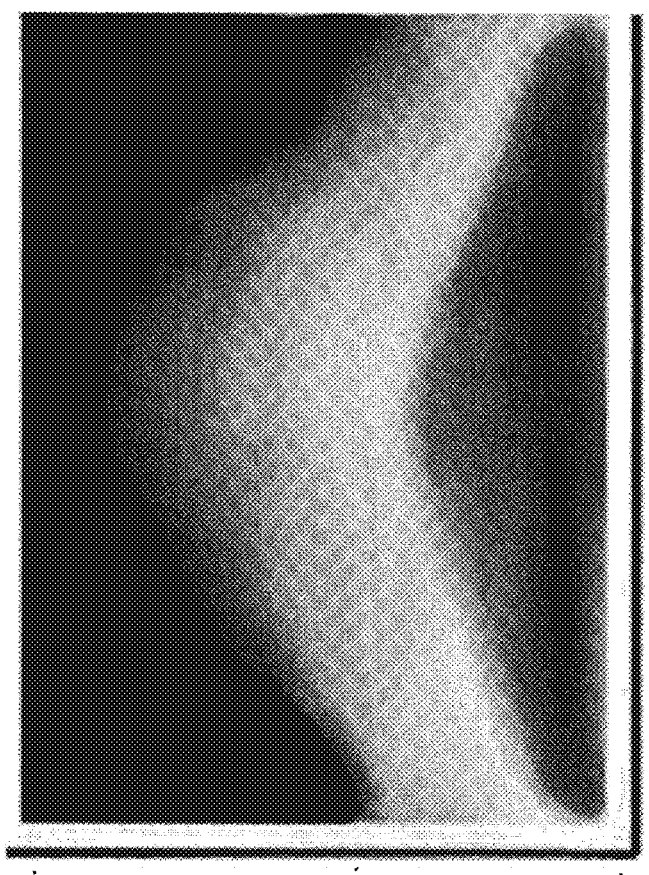
FIG. 4B is a second thumbnail displaying illumination statistics information as a function of the time of a day and the season for the second exemplary apartment.

Referring to FIGS. 4A and 4B, the lighting conditions as a function of a time of the day and as a function of the day of a year at the apartment of FIG. 3A is shown in FIG. 4A, and the lighting conditions as a function of a time of the day and as a function of a day of the year at the apartment of FIG. 3B is shown in FIG. 4B. The differences in lighting conditions are readily apparent on the thumbnail. For example, FIG. 4A shows that the first apartment area suffers from light occlusion at around noon, enjoys good sunlight between about 12:30 p.m. and about 3:00 p.m. In contrast, FIG. 4B shows that the second apartment area is occluded in late afternoon. The illumination statistics information can be combined with daily routines and preferences of a buyer or a render to determine which apartment to purchase (or rent).

In one embodiment the thumbnails can be arranged into a side panel or pasted into a scene within a location-mapped environment. In another embodiment, the thumbnails can be mapped to the selected area of a structure directly, which can be the corresponding apartment window of a building. In yet another embodiment, the thumbnails can be mapped onto a façade of a structure such as an apartment's façade as an average of all window thumbnails. Further, the computed thumbnails could also be displayed on a real estate web page as an informative information icon along with other data encoded visually, such as the average neighborhood income, children per family, etc. Yet further, a collection of thumbnails of different apartments could be shown side by side, allowing apartment shoppers to compare the lighting details for a set of apartment candidates.

The thumbnails, exemplified by FIGS. 4A and 4B, can be personalized by a user to select a customized range for the time of the day parameter and/or a customized range for the days of the year parameter. In an illustrative example, a user can select a range from 9:00 a.m. to 12:00 p.m. for the time of the day parameter and December through the following February for the days of the year parameter to get interactive information on illumination conditions in winter mornings. The user can customize any thumbnail individually, or set the parameters for all thumbnails globally. An application shown in a thumbnail can include other features for rating an apartment based on a quantized parameter derived from the illumination statistics information on pass/fail basis or on a continuous score basis. Further, the application shown in the thumbnail can include additional features that score each apartment for "points" to determine overall desirability of the apartments, or for sorting apartments based on illumination statistics information only or based on a rating system that takes into account the desirability of each apartment based on the illumination statistics information.

In one embodiment of the present disclosure, the illumination profile visualization program, which is a visualization module, can be expanded in any of the following ways, either alone or in combination. First, the pseudocoloring can be employed to better visualize the intensity levels. Second, illumination thumbnail examples of well-lit apartments can be provided to a user to help determine the baseline for comparison. Third, abstract of information thumbnails can be generated by extracting their salient features in order to enable small glyph-type displays suitable for annotation of real-estate listings, small displays, and arrangement into comparative galleries. Fourth, the program can allow users to sketch their lighting expectations (based on lifestyle, preferences, etc) into a thumbnail, e.g., in a "preference IT" that accepts user's input on lighting requirements, and then use this representation to index/search an apartment listing database. Fifth, design and test various illumination thumbnail representations and colorings, for example, via Amazon.com Mechanical Turk user studies. Sixth, a user interface can be designed that integrate a location-mapped environment, e.g., Google Street View, with illumination thumbnail displays. Seventh, a numerical score can be derived to characterize an illumination thumbnail by one or more parameters.

Figure 5:
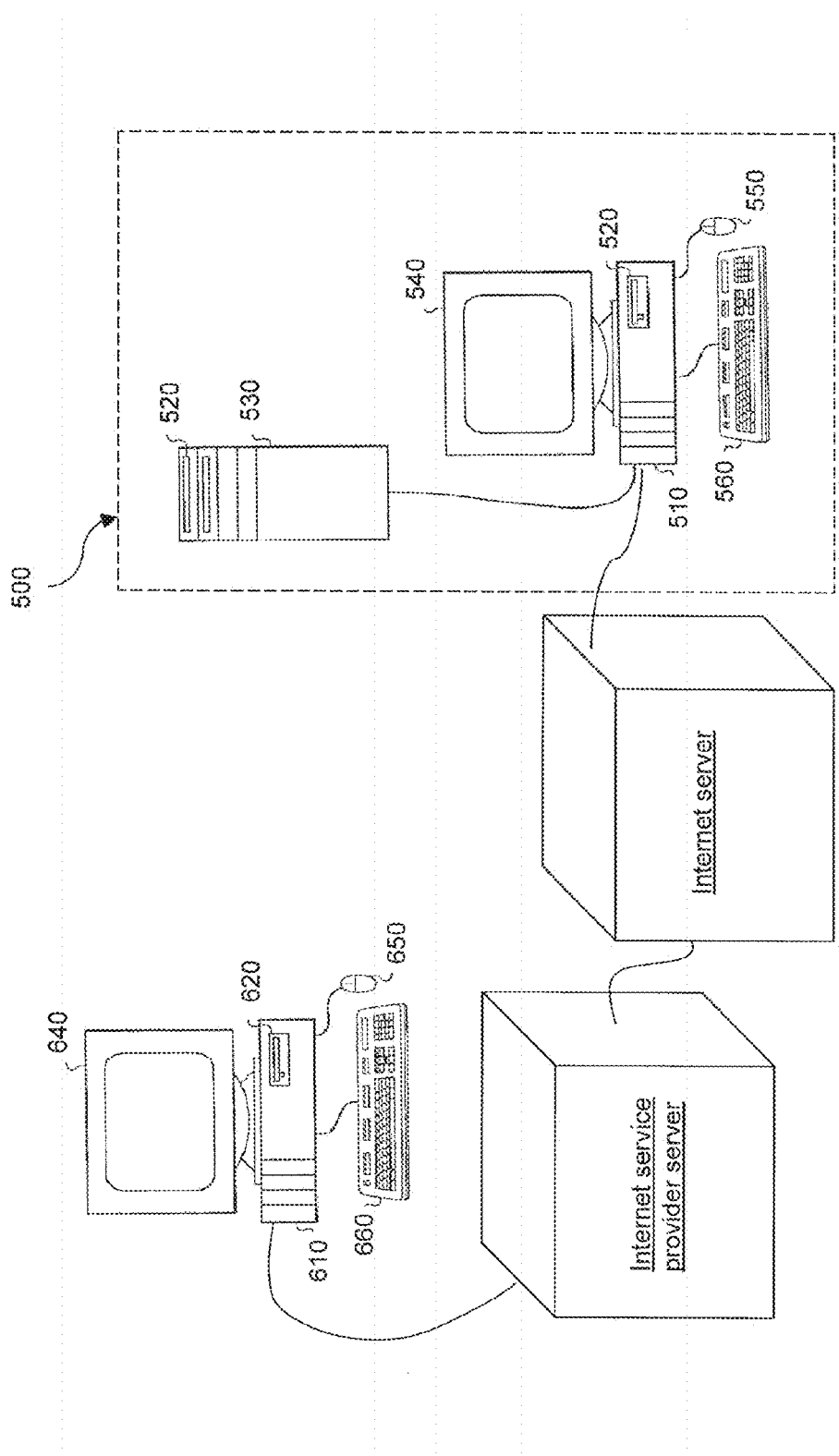
FIG. 5 is an exemplary computer system that includes a computing device that is configured to perform program instructions.

Referring to FIG. 5, an exemplary computer system 500 according to the present disclosure is shown. The exemplary computer system 500 includes a computing device that is configured to perform program instructions. The computing device can include a memory and a processor device in communication with the memory. The program instructions can configure the computing device to perform the steps of embodiments of the present invention described above. The exemplary computer system 500 can be a computer-based system in which the methods of the embodiments of the invention can be carried out by an automated program of machine-executable instructions to generate information from an object, which can be a human, an animal, or an inanimate object with internal features therein.

The computer-based system includes a processing unit 510, which can be a computing device and houses a processor device, a memory and other systems components (not shown expressly in the drawing) that implement a general purpose or special purpose processing system, or can be a computer that can execute a computer program product. The computer program product can comprise data storage media, such as a compact disc, which can be read by the processing unit 510 through a disc drive 520. Alternately or in addition, the data storage media can be read by any means known to the skilled artisan for providing the computer program product to the general purpose processing system to enable an execution thereby. The memory and the processor device are provided within the processing unit 510.

A data storage device are also provided herein that is programmable and readable by a machine and non-transitorily and tangibly embodying or storing a program of machine-executable instructions that are executable by the machine to perform the methods described. For example, the automated program can be embodied, i.e., stored, in a machine-readable data storage devices such as a hard disk, a CD ROM, a DVD ROM, a portable storage device having an interface such as a USB interface, a magnetic disk, or any other storage medium suitable for storing digital data. The program of machine-executable instructions can be employed to sequence a nucleic acid employing a system of the present invention.

The computer program product can comprise all the respective features enabling the implementation of the inventive method described herein, and which is able to carry out the method when loaded in a computer system. Computer program, software program, program, or software, in the present context means any expression, in any language, code or notation, of a set of instructions intended to cause a system having an information processing capability to perform a particular function either directly or after either or both of the following: (a) conversion to another language, code or notation; and/or (b) reproduction in a different material form.

The computer program product can be stored on hard disk drives within the processing unit 510, as mentioned, or can be located on a remote system such as a server 530, coupled to the processing unit 510, via a network interface such as an Ethernet interface or wireless connection. The server 530 can store raw image data as gathered by vehicles equipped with cameras, processed data derived from the raw image data, data from GIS building databases, information on cloud coverage, and/or any additional data required to generate the thumbnail displaying illumination statistics information as described above. Alternately, all or portions of the data residing in the server 530 can be transferred to the processing unit on a permanent basis or temporary basis. A display means 540, a mouse 550, and a keyboard 560 are coupled to the processing unit 510 to provide user interaction. All peripherals might be network coupled, or direct coupled without affecting the ability of the processing unit 510 to perform the method of the invention.

The illumination information data can be delivered to a client computer via an internet server and an internet service provider server along with information necessary to provide a location-mapped environment on another display means 640 attached to a client processing unit 610 present within a personal computer system of a user. The personal computer system can also include a disc drive 620, a keyboard 660, and a mouse 650 as well.

The present invention can be employed to provide illumination statistics information on any structure in a location-mapped environment, including, but not limited to, residential, commercial, and industrial buildings, transportation infrastructures, and tourist attractions.

While the invention has been described in terms of specific embodiments, it is evident in view of the foregoing description that numerous alternatives, modifications and variations will be apparent to those skilled in the art. Accordingly, the invention is intended to encompass all such alternatives, modifications and variations which fall within the scope and spirit of the invention and the following claims.

What is claimed is:

1. A method of generating information for a location-mapped environment comprising:
generating illumination statistics information for an area on a façade of a structure at a location in a location-mapped environment; and
displaying said illumination statistics information on a display means,
the illumination statistics information comprising a profile of changing illumination on the area over a period of time, the profile of changing illumination determined based at least on climate and environmental data associated with the location,
wherein said illumination statistics information is displayed by embedding said illumination statistics information to said area as displayed on said display means, the illumination statistics information shown as an illumination thumbnail that captures lighting conditions on the area for the period of time, the illumination thumbnail showing light intensity along horizontal-vertical axes coordinate graph, wherein the horizontal axis represents the period of time and the vertical axis represents a range of a unit of time within the period of time.

2. The method of claim 1, wherein said illumination statistics information include direct illumination statistics information based on direct illumination of sunlight on said area.

3. The method of claim 2, wherein said direct illumination statistics information is generated from a database of images that includes an image of said façade.

4. The method of claim 3, further comprising:
allocating a texture to said façade; and
performing a rendering operation of said image of said façade, wherein said rendering operation includes removing hidden surfaces of said façade from said image of said façade and rendering said façade with a storage buffer containing a light texture mapping, said light texture mapping including information on accumulation of direct illumination by the sun.

5. The method of claim 4, further comprising reducing said accumulation of direct illumination by the sun based on could-coverage data.

6. The method of claim 4, further comprising performing at least one additional rendering operation of said image of said façade for multiple times of a selected day of a year.

7. The method of claim 5, further comprising performing at least one additional rendering operation of said image of said façade for multiple selected days of a year.

8. The method of claim 1, wherein said illumination statistics information includes indirect illumination statistics information based on reflection of sunlight from objects around said area.

9. The method of claim 8, further comprising performing an additional rendering operation for each window on said façade.

10. The method of claim 9, further comprising texturing scenery around said window with textures derived from direct sunlight exposure.

11. The method of claim 9, wherein said additional rendering operation generates at least one rendering including information corresponding to light illumination visible from said area.

12. The method of claim 8, wherein said objects include at least another façade of at least another structure.

13. The method of claim 1, wherein said illumination statistics information includes direct illumination statistics information based on direct illumination of sunlight on said area and indirect illumination statistics information based on reflection of sunlight from objects around said area.

14. The method of claim 1, wherein said structure is a building.

15. The method of claim 14, wherein said area is an area of a window at said façade.

16. The method of claim 1, wherein said generating of said illumination statistics information is effected by a computing means configured to run an illumination profile authoring module and an illumination profile viewing module.

17. The method of claim 16, wherein said illumination profile viewing module displays a subset of said illumination statistics information as a function of user-provided temporal parameters.

18. The method of claim 1, wherein said generating of said illumination statistics information and said displaying of said illumination statistics information are effected by a computing means configured to run a target locator program, a geometry extractor program or a geometry and appearance extractor program, an illumination profile renderer program, and an illumination profile visualization program.

19. The method of claim 18, wherein said target locator program enables a user of an application employing a location-mapped environment to navigate to a location of interest, said geometry extractor program or said geometry and appearance extractor program extracts at least an approximation of building geometry around said location of interest, said illumination profile renderer program computes said illumination statistics information, and said illumination profile visualization program displays data including said illumination statistics information in a format that said user requests.

20. A computer system comprising:
a computing means configured to perform a sequence of operations including:
  generating illumination statistics information for an area on a façade of a structure
at a location in a location-mapped environment; and
  displaying said illumination statistics information on a display means,
the illumination statistics information comprising a profile of changing illumination on the area over a period of time, the profile of changing illumination determined based at least on climate and environmental data associated with the location,
the illumination statistics information shown as an illumination thumbnail that captures lighting conditions on the area for the period of time, the illumination thumbnail showing light intensity along horizontal-vertical axes coordinate graph, wherein the horizontal axis represents the period of time and the vertical axis represents a range of a unit of time within the period of time.

21. The computer system of claim 20, wherein said computing means is configured to display said illumination statistics information by embedding said illumination statistics information to said area as displayed on said display means.

22. The computer system of claim 20, wherein said illumination statistics information generated by said computing means includes direct illumination statistics information based on direct illumination of sunlight on said area.

23. The computer system of claim 22, wherein said computing means is configured to generate said direct illumination statistics information from a database of images that includes an image of said façade.

24. The computer system of claim 23, wherein said computing means is configured to generate said direct illumination statistics information by performing operations including:
  allocating a texture to said façade; and
  performing a rendering operation of said image of said façade, wherein said rendering operation includes removing hidden surfaces of said façade from said image of said façade and rendering said façade with a storage buffer containing a light texture mapping, said light texture mapping including information on accumulation of direct illumination by the sun.

25. The computer system of claim 24, wherein said computing means is configured to performing further operations including reducing said accumulation of direct illumination by the sun based on could-coverage data.

26. The computer system of claim 24, wherein said computing means is configured to performing further operations including performing at least one additional rendering operation of said image of said façade for multiple times of a selected day of a year.

27. The computer system of claim 24, wherein said computing means is configured to performing further operations including performing at least one additional rendering operation of said image of said façade for multiple selected days of a year.

28. The computer system of claim 24, wherein said illumination statistics information generated by said computing means includes indirect illumination statistics information based on reflection of sunlight from objects around said area.

29. The computer system of claim 28, wherein said computing means is configured to performing further operations including performing an additional rendering operation for each window on said façade.

30. The computer system of claim 29, wherein said computing means is configured to perform further operations including texturing scenery around said window with textures derived from direct sunlight exposure.

31. The computer system of claim 29, wherein said computing means is configured to generate, through said additional rendering operation, at least one rendering including information corresponding to light illumination visible from said area.

32. The computer system of claim 28, wherein said objects include at least another façade of at least another structure.

33. The computer system of claim 20, wherein said illumination statistics information generated by said computing means includes direct illumination statistics information based on direct illumination of sunlight on said area and indirect illumination statistics information based on reflection of sunlight from objects around said area.

34. The computer system of claim 20, wherein said structure is a building.

35. The computer system of claim 34, wherein said area is an area of a window at said façade.

36. The computer system of claim 20, further comprising a communication means configured to transmit said location-mapped environment for display on said display means, wherein said display means is connected to another computing means.

37. The computer system of claim 20, wherein said computing means is configured to run an illumination profile authoring module and an illumination profile viewing module.

38. The computing system of claim 37, wherein said illumination profile viewing module is configured to display a subset of said illumination statistics information as a function of user-provided temporal parameters.

39. The computing system of claim 20, wherein said computing means is configured to run a target locator program, a geometry extractor program or a geometry and appearance extractor program, an illumination profile renderer program, and an illumination profile visualization program.

40. The computing system of claim 39, wherein said target locator program enables a user of an application employing a location-mapped environment to navigate to a location of interest, said geometry extractor program or said geometry and appearance extractor program extracts at least an approximation of building geometry and appearances around said location of interest, said illumination profile renderer program computes said illumination statistics information, and said illumination profile visualization program displays data including said illumination statistics information in a format that said user requests.

41. A machine readable non-transitory tangible medium embodying a program for operating a computer system, said program comprising a sequence of operations for a computing means to perform, and said sequence of operations includes:
generating illumination statistics information for an area on a façade of a structure at a location in a location-mapped environment; and
displaying said illumination statistics information on a display means,
the illumination statistics information comprising a profile of changing illumination on the area over a period of time, the profile of changing illumination determined based at least on climate and environmental data associated with the location,
the illumination statistics information shown as an illumination thumbnail that captures lighting conditions on the area for the period of time, the illumination thumbnail showing light intensity along horizontal-vertical axes coordinate graph, wherein the horizontal axis represents the period of time and the vertical axis represents a range of a unit of time within the period of time.

42. The machine readable non-transitory tangible medium of claim 41, wherein said program includes instructions to display said illumination statistics information by embedding said illumination statistics information to said area as displayed on said display means.

43. The machine readable non-transitory tangible medium of claim 41, wherein said illumination statistics information includes direct illumination statistics information based on direct illumination of sunlight on said area.

44. The machine readable non-transitory tangible medium of claim 43, wherein said sequence of operations include generating said direct illumination statistics information from a database of images that includes an image of said façade.

45. The machine readable non-transitory tangible medium of claim 44, wherein an operation for generating said illumination statistics information includes operations of:
allocating a texture to said façade; and
performing a rendering operation of said image of said façade, wherein said rendering operation includes removing hidden surfaces of said façade from said image of said façade and rendering said façade with a storage buffer containing a light texture mapping, said light texture mapping including information on accumulation of direct illumination by the sun.

46. The machine readable non-transitory tangible medium of claim 45, wherein said sequence of operations includes a further operation of reducing said accumulation of direct illumination by the sun based on could-coverage data.

47. The machine readable non-transitory tangible medium of claim 45, wherein said sequence of operations includes a further operation of performing at least one additional rendering operation of said image of said façade for multiple times of a selected day of a year.

48. The machine readable non-transitory tangible medium of claim 45, wherein said sequence of operations includes a further operation of performing at least one additional rendering operation of said image of said façade for multiple selected days of a year.

49. The machine readable non-transitory tangible medium of claim 41, wherein said illumination statistics information includes indirect illumination statistics information based on reflection of sunlight from objects around said area.

50. The machine readable non-transitory tangible medium of claim 49, wherein said sequence of operations includes a further operation of performing an additional rendering operation for each window on said façade.

51. The machine readable non-transitory tangible medium of claim 50, wherein said sequence of operations includes a further operation of texturing scenery around said window with textures derived from direct sunlight exposure.

52. The machine readable non-transitory tangible medium of claim 50, wherein said additional rendering operation generates at least one rendering that includes information corresponding to light illumination visible from said area.

53. The machine readable non-transitory tangible medium of claim 49, wherein said objects include at least another façade of at least another structure.

54. The machine readable non-transitory tangible medium of claim 41, wherein said illumination statistics information includes direct illumination statistics information based on direct illumination of sunlight on said area and indirect illumination statistics information based on reflection of sunlight from objects around said area.

55. The machine readable non-transitory tangible medium of claim 41, wherein said structure is a building.

56. The machine readable non-transitory tangible medium of claim 55, wherein said area is an area of a window at said façade.

57. The machine readable non-transitory tangible medium of claim 41, wherein said program includes an instruction to transmit said location-mapped environment for display on said display means through internet, wherein said display means is connected to another computing means.

58. The machine readable non-transitory tangible medium of claim 41, wherein said program includes an instruction to run an illumination profile authoring module and an illumination profile viewing module.

59. The machine readable non-transitory tangible medium of claim 58, wherein said program includes an instruction to display a subset of said illumination statistics information as a function of user-provided temporal parameters by running said illumination profile viewing module.

60. The machine readable non-transitory tangible medium of claim 41, wherein said said program includes an instruction to run a target locator program, a geometry extractor program or a geometry and appearance extractor program, an illumination profile renderer program, and an illumination profile visualization program.

61. The machine readable non-transitory tangible medium of claim 60, wherein said target locator program enables a user of an application employing a location-mapped environment to navigate to a location of interest, said geometry extractor program or said geometry and appearance extractor program extracts at least an approximation of building geometry around said location of interest, said illumination profile renderer program computes said illumination statistics information, and said illumination profile visualization program displays data including said illumination statistics information in a format that said user requests.

\* \* \* \* \*